(12) United States Patent
Yin

(10) Patent No.: US 8,869,748 B2
(45) Date of Patent: Oct. 28, 2014

(54) SYSTEM AND METHOD FOR TRAINING AN ANIMAL

(76) Inventor: Sophia Yin, Davis, CA (US)

( * ) Notice: Subject to any disclaimer, the term of this patent is extended or adjusted under 35 U.S.C. 154(b) by 1015 days.

(21) Appl. No.: 12/433,877

(22) Filed: Apr. 30, 2009

(65) Prior Publication Data

US 2010/0275851 A1 Nov. 4, 2010

(51) Int. Cl.
*A01K 5/02* (2006.01)
*A01K 15/00* (2006.01)
*A01K 15/02* (2006.01)

(52) U.S. Cl.
CPC ............ *A01K 5/02* (2013.01); *A01K 15/021* (2013.01)
USPC .................. 119/720; 119/712; 119/51.02

(58) Field of Classification Search
CPC .. A01K 5/0233; A01K 5/0275; A01K 5/0283; A01K 5/0291; A01K 15/00; A01K 15/02; A01K 15/021
USPC ............... 119/51.01, 51.02, 712, 719–721
See application file for complete search history.

(56) References Cited

U.S. PATENT DOCUMENTS

| | | | |
|---|---|---|---|
| 3,011,476 A * | 12/1961 | Bell | 119/417 |
| 4,517,923 A * | 5/1985 | Palmer | 119/51.02 |
| 4,733,634 A | 3/1988 | Hooser | |
| 5,299,529 A | 4/1994 | Ramirez | |
| 5,595,141 A | 1/1997 | Udelle et al. | |
| 6,041,737 A * | 3/2000 | Hennigan | 119/165 |
| 6,044,795 A | 4/2000 | Matsuura et al. | |
| 6,135,056 A | 10/2000 | Kuo | |
| 6,227,143 B1 | 5/2001 | Papkov | |
| 6,273,027 B1 | 8/2001 | Watson et al. | |
| 6,349,671 B1 * | 2/2002 | Lewis et al. | 119/51.02 |
| 6,651,592 B2 | 11/2003 | Maddox et al. | |
| 6,681,718 B1 | 1/2004 | McIlarky | |
| 6,983,719 B2 * | 1/2006 | Armstrong | 119/51.02 |
| D517,747 S | 3/2006 | Martin | |
| 7,124,707 B1 * | 10/2006 | Clarke | 119/51.02 |
| 7,252,049 B2 | 8/2007 | Ginsberg | |
| 7,328,671 B2 * | 2/2008 | Kates | 119/720 |
| 7,458,336 B2 * | 12/2008 | Eu | 119/51.02 |
| 7,832,355 B2 * | 11/2010 | Mills | 119/51.02 |
| 7,895,973 B1 * | 3/2011 | Whelan | 119/51.02 |
| 8,061,300 B2 * | 11/2011 | McElroy, Jr. | 119/61.55 |
| 2002/0134313 A1 | 9/2002 | King et al. | |
| 2002/0169009 A1 | 11/2002 | Reiner | |
| 2005/0224003 A1 | 10/2005 | Yin et al. | |
| 2006/0213453 A1 | 9/2006 | Conrady | |
| 2007/0295277 A1 * | 12/2007 | Kin et al. | 119/51.02 |

* cited by examiner

*Primary Examiner* — David Parsley
(74) *Attorney, Agent, or Firm* — Patrick Caldwell; James Harrison

(57) ABSTRACT

A method for training, exercising, and entertaining an animal comprises providing in a first location a dispenser comprising a storage compartment, a first signaling module, and a wireless module configured to receive a dispense signal. A target is provided in a second location and a system configuration of the dispenser and the target is set. The target transmits a dispense signal in response to a detected predetermined animal behavior. The dispenser generates a reward signal and dispenses a reward only in response to a received dispense signal. The system configuration comprises a training program, a session length, and a periodicity.

9 Claims, 8 Drawing Sheets

SYSTEM AND METHOD FOR TRAINING AN ANIMAL

TECHNICAL FIELD

The present invention relates generally to the field of animal training, entertainment, exercise, and enrichment, and in particular, to a system and method for training an animal.

BACKGROUND OF THE INVENTION

Humans have domesticated and trained animals for thousands of years. Additionally, many modern humans often choose to share their residences with companion animals, especially dogs and cats. This domestic living, in which pets have easy access to food and relatively little access to exercise and activities, has contributed to obesity, behavioral issues related to boredom, and other problems. Therefore, a need exists for a way in which to supplement the pet's exercise and entertainment/enrichment both when the owner/caregiver of the animal is home as well as when the owner/caregiver leaves the animal's presence.

A number of methods attempt to address the need to provide for entertainment and exercise for confined animals. One such method spreads food about the space in which the animal is confined. The animal then searches out the food using their natural abilities. In the method described in U.S. Pat. No. 7,252,049 B2, a user scatters food in a random manner using a device to ensure that the animal faces a challenging non-repetitive activity. Unfortunately, the method has a large drawback in that it causes food to be scattered about the space, some of which goes unfound by either the owner or the animal. Unfound food attracts pests and leads to the growth of fungus and molds, which cause unpleasant odors. Consequently, there is a need for a device and/or method by which to entertain and feed an animal without causing food to be scattered unfound about the dwelling space.

Many other devices currently used to entertain an animal are stationary objects that require the animal to initiate movement or interaction with the device, such as a ball or toy mouse. Animals often become bored because the device does not provide a new or exciting activity in which the animal participates, even for systems that can offer activities at any time, but must be initiated by the animal. Therefore, there is a need for a device or method capable of training and entertaining an animal without requiring the animal to initiate the interaction.

Other devices, such as the device described in U.S. Pat. No. 6,044,795, attempt to stimulate the animal by initiating an activity in which the animal participates in a prescribed manner. These devices provide a food incentive to encourage the animal to participate with the device. However, these devices also require the animal to wear a proximity sensor to indicate that the animal is nearby. As such, these devices do not solve the problem of waning animal interest. The animal must still be interested enough in the device to approach within the proximity sensor's detection zone. If the animal loses interest in the device, there is no incentive for the animal to approach and continue playing. Once the animal has become bored, and the animal no longer goes near the device, the device is no longer able to stimulate and entertain the pet. Therefore, there is a need for a device that can train and entertain the animal without requiring the animal to show an initial or continuing interest in the device.

Other modern devices utilize small attachments that launch from the device, such as that described in U.S. Patent App. No. 2006/0213453. This device entertains the animal by launching attachments for the animal to chase and catch. Unfortunately, these devices are prone to jamming or the loss of the attachments. Further, even if the attachments are not lost, the devices often require the owner to be present in order to activate the device. Therefore, there is a need for a device that can train and entertain an animal without the presence of the owner, or the use of small, easily losable attachments.

Other modern devices move an object repeatedly in order to tempt the animal into attacking the object, such as the device described in U.S. Pat. No. 5,595,141. Repetitive motion and lack of a reward or treat limit the effectiveness of these kinds of devices. Additionally, the animal's grip is often stronger than the force exerted by the device. When the animal catches the moving portion of the device, the device is unable to continue the game. When the game ceases the animal becomes bored and loses interest in the device. Therefore, there is a need for an entertainment device that can continually keep the animal entertained beyond the period in which the animal has captured or otherwise interacted with the device.

Other devices attempt to entice the animal with food rewards dispensed from the same device that gains the animal's attention, such as the devices described in U.S. Pat. No. 6,273,027 for example. However, the proximity of the training signal and the food dispenser limit the effectiveness of these kinds of devices. The exercise range for the animal is therefore also limited, decreasing the effectiveness of the device in terms of exercise and entertainment.

Therefore, there is a need for a system and/or method for training an animal that addresses at least some of the problems and disadvantages associated with conventional systems and methods.

BRIEF SUMMARY

The following summary is provided to facilitate an understanding of some of the innovative features unique to the embodiments disclosed and is not intended to be a full description. A full appreciation of the various aspects of the embodiments can be gained by taking into consideration the entire specification, claims, drawings, and abstract as a whole.

It is, therefore, one aspect of the embodiments described herein to provide an improved animal training, exercise, and entertainment device accomplishing the improved methods described below.

It is, therefore, one aspect of the embodiments described herein to provide an improved method of training and entertaining an animal without leaving unfound food to attract pests.

It is a further aspect of the embodiments described herein to provide for an improved method of training and entertaining an animal that does not require the animal to initiate the training/entertainment.

It is a further aspect of the embodiments described herein to provide for an improved method of training and entertaining an animal that does not require the animal's proximity to initiate animal entertainment.

It is a further aspect of the embodiments described herein to provide for an improved method of training and entertaining an animal that does not include easily scattered or lost attachments.

It is a further aspect of the embodiments described herein to provide for an improved method of training and entertaining an animal that does not rely on repetitive motion of moving parts to entertain the animal.

It is a further aspect of the embodiments described herein to provide for an improved method of training and entertaining an animal that does not require human presence to initiate each animal entertainment session.

The aforementioned aspects and other objectives and advantages can now be achieved as described herein. A method for training an animal comprises providing a dispenser in a first location accessible to a predetermined animal. The dispenser comprises a storage compartment configured to store and to dispense food rewards, a first signaling module configured to generate a reward signal, and a wireless module configured to receive a dispense signal. A target is provided in a second location, wherein the second location is a fixed distance from the first location and the fixed distance is based on a training condition for the animal. A system configuration of the dispenser and the target is set. The target comprises a second signaling module, a sensor, and a wireless module configured to transmit a dispense signal. The sensor is configured to detect a predetermined animal behavior. The target is configured to transmit the dispense signal in response to a detected predetermined animal behavior. The dispenser is further configured to generate a reward signal and to dispense a reward only in response to a received dispense signal. The system configuration comprises a training program, a session length, and a periodicity.

In an alternate embodiment, a system for training an animal comprises a dispenser disposed in a first location, the first location accessible to a predetermined animal. The dispenser comprises a user interface configured to receive a system configuration, a storage compartment configured to store food rewards and to dispense rewards, a first signaling module configured to generate a reward signal, and a wireless module configured to receive a dispense signal. The system also comprises a target disposed in a second location, wherein the second location is a fixed distance from the first location and the fixed distance is based on a training condition for the animal. The target comprises a second signaling module, a sensor, and a wireless module configured to transmit a dispense signal. The sensor is configured to detect a predetermined animal behavior. The target is configured to transmit the dispense signal in response to a detected predetermined animal behavior. The dispenser is further configured to generate a reward signal and to dispense a reward only in response to a received dispense signal. The system configuration comprises a training program, a session length, and a periodicity.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope of the invention. While numerous specific details are set forth to provide a thorough understanding of the present invention, those skilled in the art will appreciate that the present invention may be practiced without such specific details. In other instances, well-known elements have been illustrated in schematic or block diagram form in order not to obscure the present invention in unnecessary detail. Additionally, many modifications and variations will be apparent to one of ordinary skill in the relevant arts.

Figure 1:
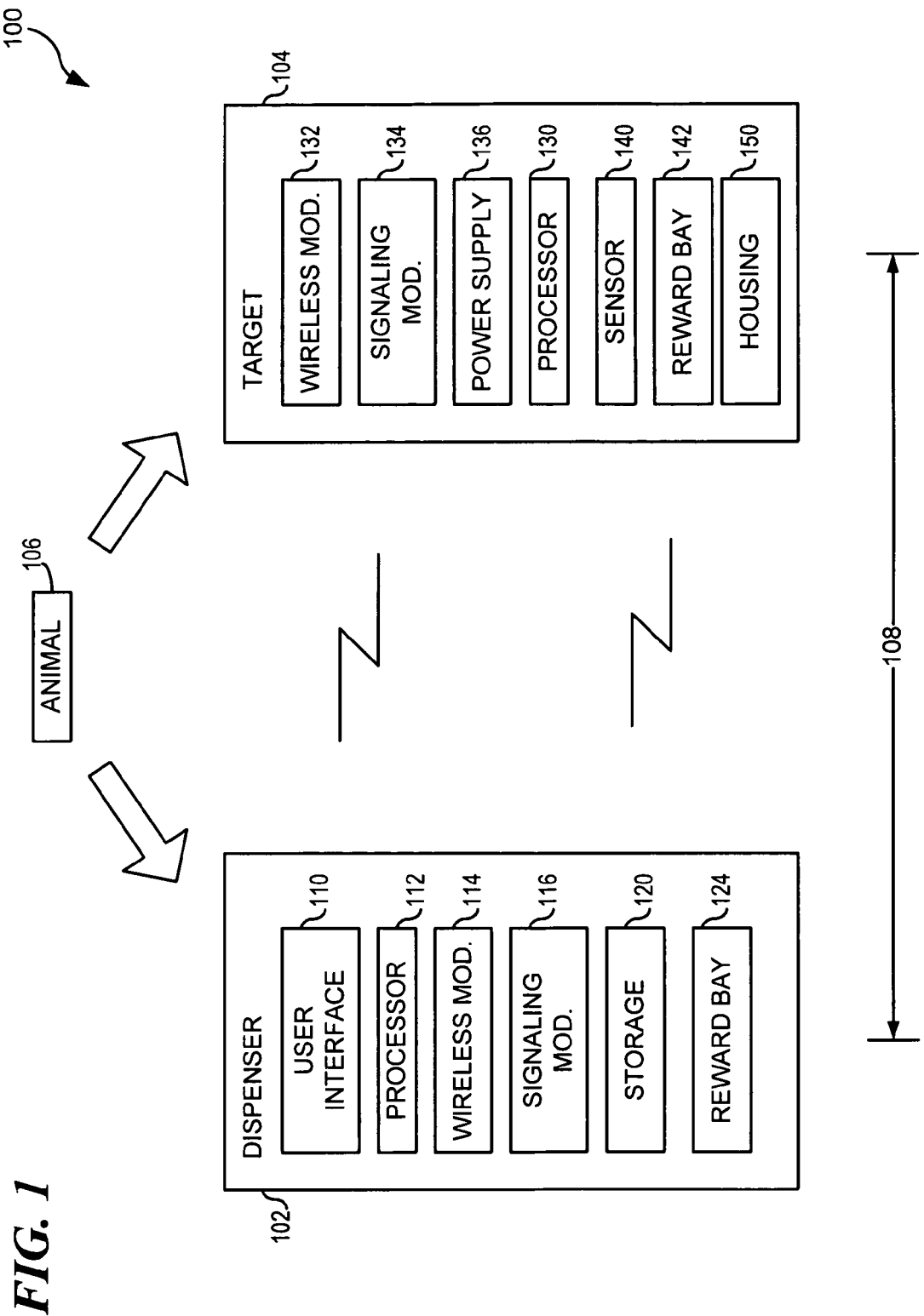
FIG. 1 illustrates a high-level block diagram showing an animal training system in accordance with one embodiment of the present invention.

Referring now to the drawings, FIG. 1 illustrates a high-level block diagram of a system 100 for training and entertaining an animal. In accordance with one embodiment of the present invention, system 100 comprises a dispenser 102 and a target 104. Very generally, in one embodiment, an animal 106 activates a sensor of target 104, which signals to dispenser 102 to emit a signal recognizable to the animal, and dispense a food reward within a fraction of a second for the animal 106. Animal 106 moves back and forth between dispenser 102 and target 104 as system 100 generates various stimuli and rewards, as described in more detail below.

As illustrated, animal 106 is depicted as a generic block. One skilled in the art will understand that animal 106 can be any animal suitable for training, including birds, cats, dogs, horses, etc. However, for ease of illustration, the various embodiments described herein will be discussed with respect to training and/or entertaining dogs.

Additionally, the animal rewards described herein are food rewards. Generally, food rewards are rewards the animal enjoys eating. In one embodiment, the food rewards are dispensed in small amounts. In one embodiment, the food rewards are smaller than snack size for the animal. In one embodiment, the food rewards are training size. In one embodiment, the food rewards are of a size such that the caloric value of the reward is less than or equal to the energy expended by the animal in earning the food reward. As used herein, "reward" or "rewards" means "food reward" or "food rewards."

Generally, a trainer places dispenser 102 in a location accessible to animal 106. A trainer places target 104 a fixed distance 108 from dispenser 102. In one embodiment, a trainer sets fixed distance 108 based on relevant training conditions. Generally, relevant training conditions include the area of the space in which the animal resides, the age and fitness level of the animal, the desired amount of exercise for the animal, the stage of training, the animal's experience with the training, the amount of food the dog has already eaten that day (i.e., that dog's satiation level), and other suitable factors.

In the illustrated embodiment, dispenser 102 includes a user interface 110 and a processor 112. As described in more detail below, user interface 110 is configured to receive user input comprising a system configuration. In one embodiment, the system configuration includes a training program, a session length, and a periodicity. Processor 112 is an otherwise conventional processor, configured as described herein. In one embodiment, processor 112 comprises a sleep mode circuit configured to place dispenser 102 in a low-power state after a predetermined period of inactivity.

Dispenser 102 also includes wireless module 114 and signaling module 116. Generally, wireless module 114 couples to processor 112 and is configured to send and receive wireless transmissions including a dispense signal and an attention signal, described in more detail below. Generally, signaling module 116 couples to processor 112 and is configured to generate a reward signal (an audible tone or visual light) detectable by animal 106, described in more detail below. In one embodiment, signaling module 116 is a speaker. In an alternate embodiment, signaling module 116 is a light emitting diode (LED). In one embodiment, signaling module 116 includes a speaker and an LED. In one embodiment, the LED is bright blue.

In one embodiment, the reward signal is an audible (to the animal 106) tone or other sounds. In an alternate embodiment, the reward signal is a flashing light, an LED light, or other visual cue. In an alternate embodiment, the reward signal is an audible tone and a visible light.

In the illustrated embodiment, dispenser 102 includes storage 120 and reward bay 124. Generally, storage 120 is a storage area or receptacle configured to store food reward units for subsequent dispensation to animal 106. In one embodiment, the reward units are small bits of food desirable to animal 106. Generally, reward bay 124 couples to storage 120 and is configured to dispense discrete amounts of food reward units from storage 120 into a receptacle configured to allow access to animal 106. In a preferred embodiment, the discrete amount dispensed by reward bay 124 is 1 to 2 kibbles of food. In one embodiment, reward bay 124 includes a clearing mechanism, such as a motor reversal circuit, for example, configured to clear jammed food reward units. As described above, in one embodiment, dispenser 102 dispenses a food reward in response to a dispense signal from target 104.

In the illustrated embodiment, target 104 includes processor 130, wireless module 132, and signaling module 134. Processor 130 is an otherwise conventional processor, configured as described herein. In one embodiment, processor 130 comprises a sleep mode circuit configured to place target 104 in a low-power state after a predetermined period of inactivity.

Generally, wireless module 132 couples to processor 130 and is configured to send and receive wireless transmissions including a dispense signal and an attention signal, described in more detail below. Generally, signaling module 134 couples to processor 130 and is configured to generate a trigger signal detectable by animal 106, described in more detail below. In one embodiment, signaling module 134 is a speaker. In an alternate embodiment, signaling module 134 is a light emitting diode (LED). In one embodiment, signaling module 134 includes a speaker and an LED. In one embodiment, the LED is bright blue.

In one embodiment, the trigger signal is an audible (to the animal 106) tone or other sounds. In an alternate embodiment, the trigger signal is a flashing light, an LED light, or other visual cue. In an alternate embodiment, the trigger signal is an audible tone and a visible light.

In the illustrated embodiment, target 104 includes power supply 136. Generally, power supply 136 provides power to the various elements of target 104. In one embodiment, power supply 136 comprises a battery compartment (not shown) and a power switch (not shown). In one embodiment, power supply 136 is configured to receive four conventional AA size batteries.

In the illustrated embodiment, target 104 also includes a sensor 140. In one embodiment, sensor 140 is an otherwise conventional sensor, such as a pressure sensor, for example. In an alternate embodiment, sensor 140 is a touch sensor configured to sense contacts made by a dog using its paw, nose, or any part of its body. In one embodiment, sensor 140 includes a piezoelectric element (not shown). The piezoelectric element mounts to the target housing beneath a dome shaped section piece of plastic membrane (not shown). When a dog makes contact with sensor 140, vibration produced during the impact passes to the piezoelectric element to generate an electric signal transmitted to processor 130. In one embodiment, sensor 140 is configured such that the arrangement of the piezoelectric element and the plastic membrane responds only to direct impact from a dog or cat, filtering out vibrations from other surrounding sources.

In the illustrated embodiment, target 104 also includes a reward bay 142, described in more detail below. Generally, reward bay 142 is a receptacle formed from a housing of target 104, and is configured to receive a food reward and to allow access to animal 106. As described in more detail below, an animal 106 may need encouragement to recognize target 104, in which case placement of a small food reward in reward bay 142 can motivate animal 106 to approach target 104. In an alternate embodiment, target 104 includes a plurality of reward bays 142. In one embodiment, reward bay 122 also includes a grasping point configured for a human user to grasp and manipulate target 104.

In the illustrated embodiment, target 104 also includes a housing 150. Generally, housing 150 is constructed from durable, animal-resistant material and, in one embodiment, comprises a shape configured to cause an animal difficulty in picking up and/or moving target 104. In one embodiment, housing 150 is configured with a shape similar to an inverted soup bowl. Generally, the components of target 104 are disposed within and protected by housing 150.

Figure 2:
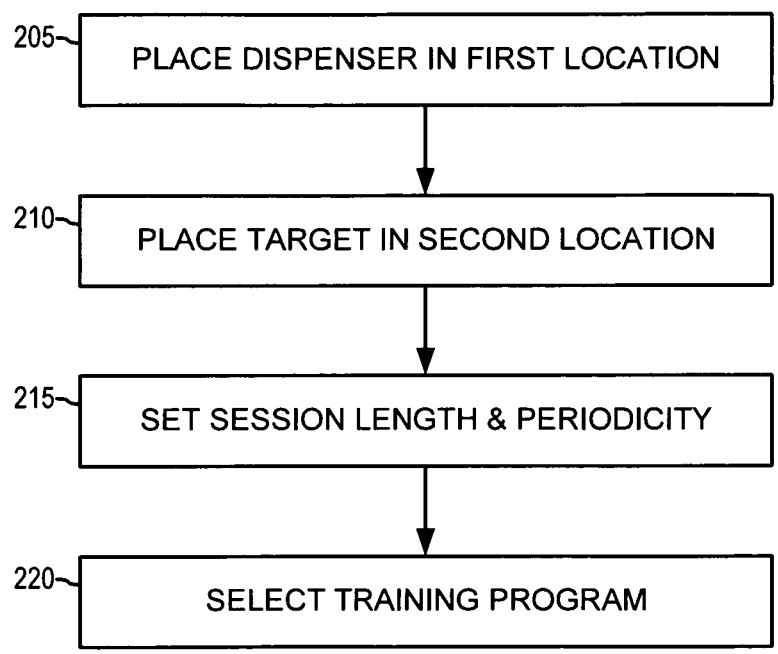
FIG. 2 illustrates a high-level flow diagram depicting logical operational steps of an improved animal training method, which can be implemented in accordance with a preferred embodiment.

Thus, as generally described above, system 100 can be configured to provide a training, exercise, and entertainment system for an animal. FIG. 2 describes a very general approach for a user to operate system 100, illustrating one embodiment of a method for animal training. Specifically, FIG. 2 illustrates a very high-level flow chart 200 that depicts logical operational steps performed by, for example, a trainer operating system 100 of FIG. 1, which may be implemented in accordance with a preferred embodiment.

As illustrated at block 205, the process begins and a trainer places a dispenser 102 in a first location. As illustrated at block 210, the trainer places a target 104 in a second location. As described above, in one embodiment, the second location is a fixed distance from the first location and the fixed distance is a function of the training conditions for the animal.

Next, as illustrated at block 215, the trainer sets a session length and periodicity. In one embodiment, the trainer configures the system for continuous operation, and the session length is unbounded and of a single continuous instance. In an alternate embodiment, the trainer selects a session length and a number of sessions (periodicity) by interaction with user interface 110, for example.

Next, as illustrated at block 220, the trainer selects a training program. In one embodiment, the trainer selects one of a finite plurality of training programs by interaction with user interface 110, for example. In one embodiment, the trainer selects one of a plurality of tiered training programs. Specifically, in one embodiment, the trainer selects from among the training programs as described in conjunction with FIGS. 3-5, below.

Figure 3:
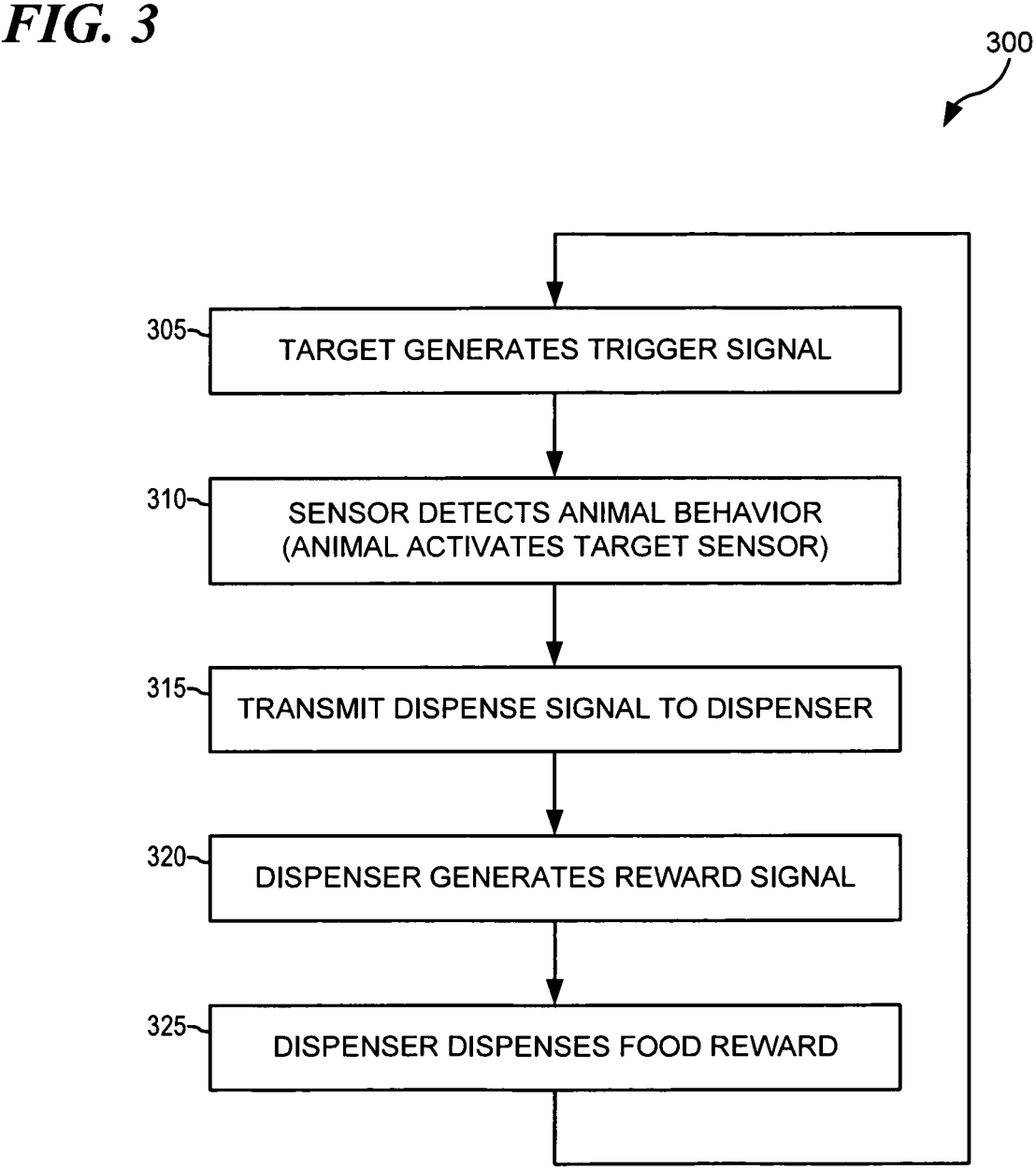
FIG. 3 illustrates a high-level flow diagram depicting logical operational steps of an improved animal training method, which can be implemented in accordance with a preferred embodiment.

Referring now to FIG. 3, illustrated is a high-level flow chart 300 that depicts logical operational steps performed by, for example, system 100 of FIG. 1, which may be implemented in accordance with a preferred embodiment. Specifically, FIG. 3 illustrates one embodiment of a first training level of a tiered training program.

As illustrated at block 305, the process begins and a target generates a trigger signal. In one embodiment, the dispenser or base unit transmits an attention signal to the target, directing the target to begin the session. For example, signaling module 134 generates a trigger signal. In one embodiment, the trigger signal is an illuminated LED light. In one embodiment, this step is omitted. Next, as illustrated at block 310, the target sensor detects a predetermined animal behavior. In one embodiment, the animal activates the target sensor though physical contact. For example, animal 106 activates sensor 140. In one embodiment, the animal must depress the sensor. In one embodiment, the sensor detects vibration (changes in pressure) transmitted to the sensor when the animal touches the sensor. In one embodiment, the vibration required is set based on the ability of average small dogs or cats to learn to depress it easily.

Next, as illustrated at block 315, the target transmits a dispense signal to the dispenser in response to the detected predetermined animal behavior. For example, wireless module 132 transmits a dispense signal to wireless module 114. Next, as illustrated at block 320, the dispenser generates a reward signal. For example, signaling module 116 generates a reward signal. In one embodiment, the reward signal is an audible tone and an illuminated LED light. In one embodiment, the reward signal is an audible tone and visual signal generated within 0.3 sec after the animal activates the target sensor. In one embodiment, signaling module 116 generates the reward signal within 100-300 ms.

In one embodiment, the reward signal from the dispenser must occur within 0.3 seconds of the animal's desired behavior, such as the target being depressed, as described above. In one embodiment, the dispenser dispenses the food reward within 1 second of the target being depressed. One skilled in the art will understand that the dispense signal and the food reward must occur within the animal's attention window, such that it appears nearly simultaneous to the animal. Otherwise, the animal will find it difficult to associate the desired behavior with the dispense signal, and the dispense signal with the reward dispensation. When the animal cannot associate the dispense signal with the reward dispensation, the animal will get bored with the game due to the perceived unreliability of the reward.

Next, as illustrated at block 325, the dispenser dispenses a food reward. For example, reward bay 124 dispenses a food reward unit from storage 120. In one embodiment, the dispenser dispenses a food reward within one second of the animal activating the target sensor. In the illustrated embodiment, the process returns to block 305, wherein the target generates a trigger signal. As such, generally, the first training level teaches the dog that it can activate the sensor on the target to earn food dispensed at the dispenser, at any time the system is available and powered on.

Thus, at the exemplary first training level, the dog can activate the target sensor at his own rate (by, for example, pressing the target sensor with his nose or paw) until he gets bored, tired, or he finishes his meal. Additionally, the dog can activate the target sensor whenever he is hungry. In one embodiment, the systems transitions into a low-power sleep mode after a predetermined period of inactivity and transitions into a normal operational mode when the dog next activates the target sensor.

As described above, in one embodiment, the dispenser generates a reward signal in response to receiving the dispense signal. Specifically, in one embodiment, when the dog activates the target sensor (310), the dispenser generates the reward signal (320) within a fraction of a second of receiving the dispense signal (315), followed by immediate food dispensing (325). As such, the dog learns to associate the target sensor activation with the food reward—that is, touching the target leads to food dispensing.

Accordingly, the first training level advantageously provides a training system with minimal pre-training required. Moreover, the first training level allows the animal to use the training system when the trainer/owner is home and/or when the trainer/owner is not at home. Additionally, the first training level can provide both exercise and enrichment. The further away the target is from the dispenser, the more exercise the dog will get.

In some cases, certain animals may develop undesirable behaviors in response to the first training level. For example, in some cases, the dog may paw or nose the target all the time (i.e., become "obsessed"), even when there are no more food rewards being dispensed. In such cases, the trainer can remove the target and/or dispenser periodically, to prevent the dog from pawing at it. Alternately, the trainer can advance the dog to a higher training level, such as a second training level, for example.

Figure 4:
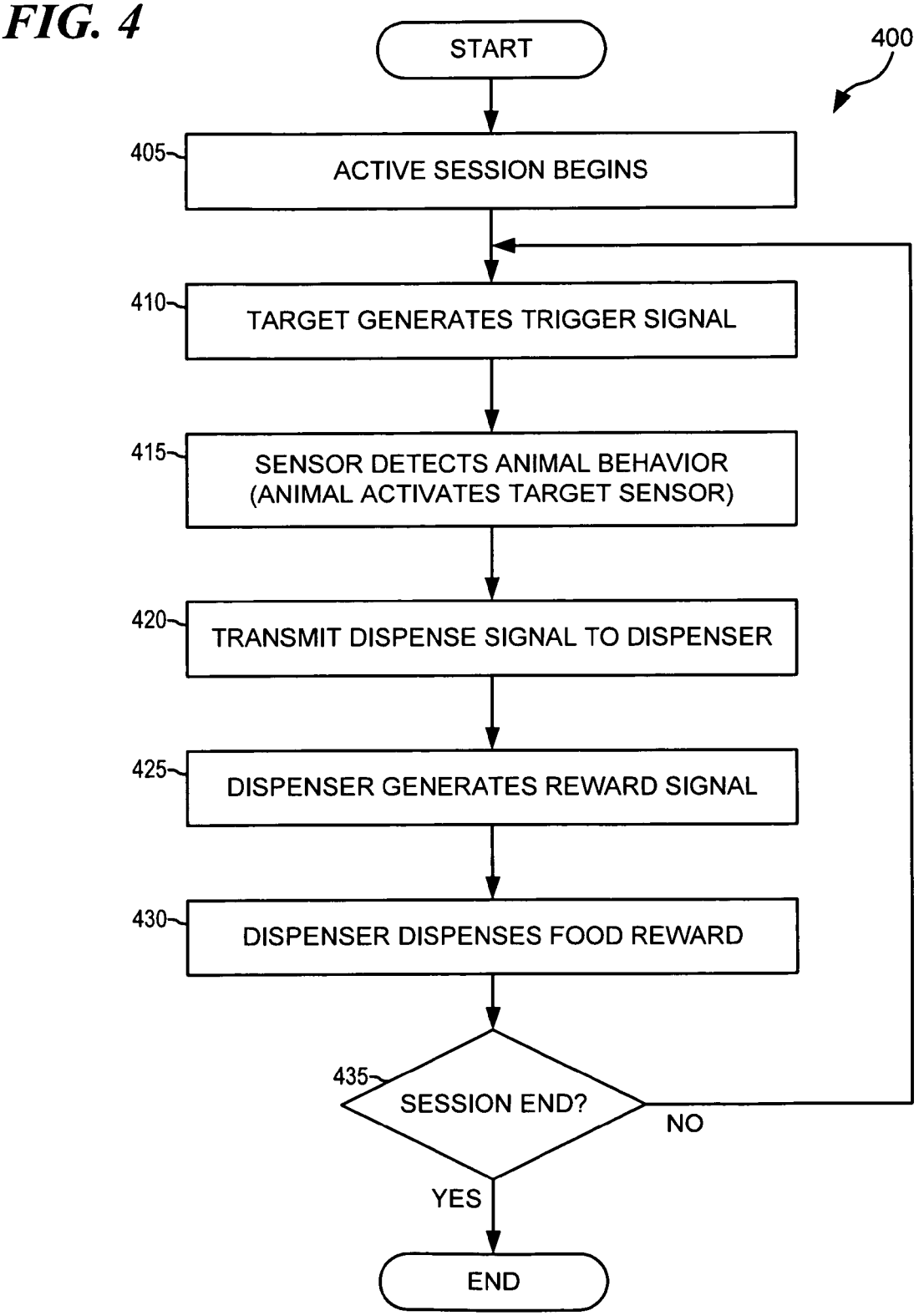
FIG. 4 illustrates a high-level flow diagram depicting logical operational steps of an improved animal training method, which can be implemented in accordance with a preferred embodiment.

Referring now to FIG. 4, illustrated is a high-level flow chart 400 that depicts logical operational steps performed by, for example, system 100 of FIG. 1, which may be implemented in accordance with a preferred embodiment. Specifically, FIG. 4 illustrates one embodiment of a second training level of a tiered training program.

As illustrated at block 405, the process begins and an active session begins. For example, in one embodiment, the target is periodically active for a certain predetermined duration, an "active session", instead of remaining continuously in an active state. In one embodiment, the trainer selects a session duration and a number of sessions (periodicity) by interaction with a user interface of the dispenser and/or the target.

Next, as illustrated at block 410, the target generates a trigger signal. For example, signaling module 134 generates a trigger signal. In one embodiment, the trigger signal is an audible, visual, and/or other signal, such as a tune that plays continuously during the active session, for example. In one embodiment, the trigger signal is an illuminated LED light. In an alternate embodiment, the trigger signal is a series of audible tones of a predetermined duration. In one embodiment, the trigger signal of the second training level is different from the trigger signal of the first training level. Next, as illustrated at block 415, the target sensor detects a predetermined animal behavior. In one embodiment, the animal activates the target sensor though physical contact. For example, animal 106 activates sensor 140.

Next, as illustrated at block 420, the target transmits a dispense signal to the dispenser in response to the detected predetermined animal behavior. For example, wireless module 132 transmits a dispense signal to wireless module 114. Next, as illustrated at block 425, the dispenser generates a reward signal. For example, signaling module 116 generates a reward signal. In one embodiment, the reward signal is an audible tone and an illuminated LED light.

Next, as illustrated at block 430, the dispenser dispenses a food reward. For example, reward bay 124 dispenses a food reward from storage 120. Next, as illustrated at decisional block 435, the system determines whether the session is over, based on whether the predetermined session duration has elapsed. In the event the session is over, the process continues along the YES branch and the process ends.

In the event the session is not over, the process continues along the NO branch, returning to block 410, wherein the target generates a trigger signal. As such, generally, the second training level teaches the dog that it can activate the sensor on the target to earn food dispensed at the dispenser, at any time during an active session, as indicated by the trigger signal.

Thus, at the exemplary second training level, the dog has the opportunity to play the target game for food rewards during specific sessions during the day. In one embodiment, a tune sounds continuously (and the target LED lights) during the entire game session, signaling to the dog that when he activates the target sensor, the food will be dispensed at the dispenser. During the active session, the dog can "target" (i.e., activate the target sensor) as quickly or slowly as he wants. In one embodiment, at the end of the session, the sound/light stops, passively signaling the end of the session. In some cases, if the session ends while the dog is still hungry and trying to earn food, the dog may will paw or nose the target when the active session ends. In many cases, however, the dog will learn that pawing the target outside of an active session (i.e., when the target appears "off" to the dog) will not earn food rewards.

Accordingly, the second training level advantageously provides a training system configured for periodic, automatic training, entertainment and exercise throughout the day. That is, the second training level includes the same uses as the first training level, and in addition, the system can be used to entertain the dog throughout the day in set sessions when the trainer/owner is home and/or when the trainer/owner is not at home. Moreover, the trainer/owner can specify the duration and periodicity of the active sessions. Together with the distance between the target and the dispenser, the active session length determines the rate at which the dog can activate the target sensor and eat. Additionally, over time, the dog will learn not to nose or paw the target outside of an active session.

Figure 5:
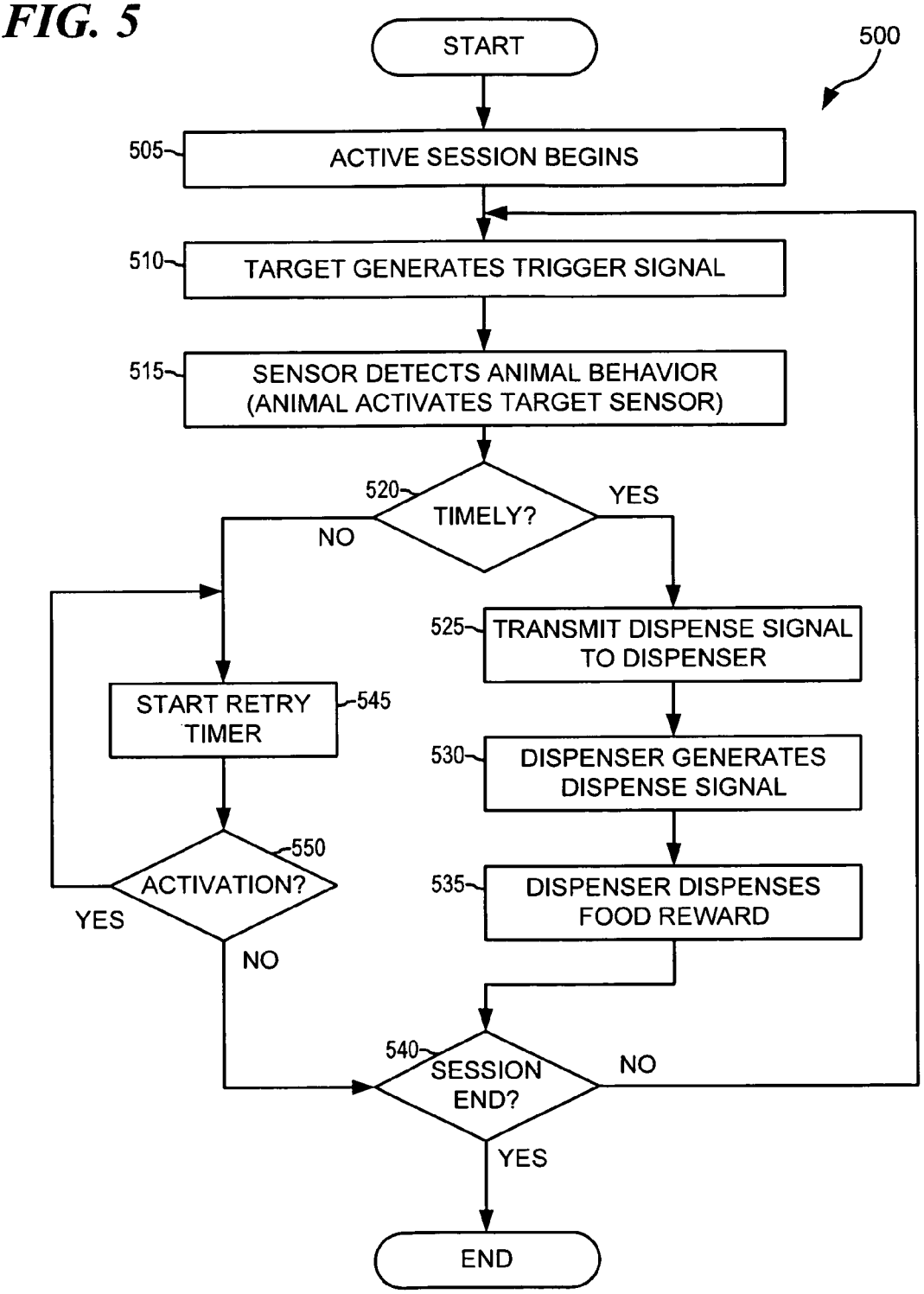
FIG. 5 illustrates a high-level flow diagram depicting logical operational steps of an improved animal training method, which can be implemented in accordance with a preferred embodiment.

Additionally, the trainer can advance the dog to a higher training level, such as a third training level, for example. Referring now to FIG. 5, illustrated is a high-level flow chart 500 that depicts logical operational steps performed by, for example, system 100 of FIG. 1, which may be implemented in accordance with a preferred embodiment. Specifically, FIG. 5 illustrates one embodiment of a third training level of a tiered training program.

As illustrated at block 505, the process begins and an active session begins. In one embodiment, the trainer selects a session duration and a number of sessions (periodicity) by interaction with a user interface of the dispenser and/or the target. Next, as illustrated at block 510, the target generates a trigger signal. For example, signaling module 134 generates a trigger signal. In one embodiment, the trigger signal is an illuminated LED light. In an alternate embodiment, the trigger signal is a series of audible tones of a predetermined duration. In one embodiment, the trigger signal of the third training level is different from the trigger signal of the first training level and the second training level. In one embodiment, the trigger signal of the third training level is shorter in duration than the trigger signal of the second training level.

Next, as illustrated at block 515, the target sensor detects a predetermined animal behavior. In one embodiment, the animal activates the target sensor though physical contact. For example, animal 106 activates sensor 140.

Next, as illustrated at decisional block 520, the system determines whether the animal timely activated the target sensor. In one embodiment, the system determines whether the animal activated the target sensor during the trigger signal. In an alternate embodiment, the target sensor is disabled except during the trigger signal.

In the event the animal timely activated the target sensor, the process continues along the YES branch to block 525. Next, as illustrated at block 525, the target transmits a dispense signal to the dispenser in response to the detected predetermined animal behavior. For example, wireless module 132 transmits a dispense signal to wireless module 114. Next, as illustrated at block 530, the dispenser generates a reward signal. For example, signaling module 116 generates a reward signal. In one embodiment, the reward signal is an audible tone and an illuminated LED light.

Next, as illustrated at block 535, the dispenser dispenses a food reward. For example, reward bay 124 dispenses a food reward from storage 120. Next, as illustrated at decisional block 540, the system determines whether the session is over, based on whether the predetermined session duration has elapsed. In the event the session is over, the process continues along the YES branch and the process ends.

In the event the session is not over, the process continues along the NO branch, returning to block 510, wherein the target generates a trigger signal, and the process continues as described above. If, at decisional block 520, the animal did not activate the target sensor timer in a timely manner (i.e., while the tone or light cue are on), the process continues along the NO branch to block 545, and no reward is dispensed. Next, as illustrated at block 545, the system starts a retry timer, during which time the target is inactive when depressed. For example, processor 130 starts a retry timer.

Next, as illustrated at decisional block 550, the system determines whether the animal has activated the target sensor during the retry timer. In the event the animal has activated the target sensor during the retry timer, the process continues along the YES branch, returning to block 545, wherein the system resets the retry timer. In the event the animal has not activated the target sensor during the retry timer (when the target is inactivated), the process continues along the NO branch to decisional block 540, as described above.

As such, generally, the third training level teaches the dog that it can activate the sensor on the target to earn food dispensed at the dispenser, at any time during an active session, as indicated by the trigger signal. Moreover, the dog has the opportunity to play the target game for food during specific active sessions during the day, and during these sessions the system dictates how frequently the dog can obtain food rewards.

For example, in one embodiment, at the start of the session the trigger signal (here, a tune) plays for 5 seconds. If the dog activates the target sensor while the tune is playing, the dispenser provides a food reward. If the dog does not activate the target sensor in time, the dog has to wait for the tune to play again to be rewarded. Further, the dog receives no food rewards if he activates the target sensor when the target is off.

Additionally, in one embodiment, if the dog waits 5-10 seconds after the last sensor activation, the system will offer the dog another chance. In one embodiment, if the dog activates the target sensor at the right time (thereby earning the food reward), the system can still delay 5-15 seconds before the next trigger signal. Furthermore, for training purposes, the longer the delay between trigger signals in an active session, the longer the dog will wait around after the active session has ended.

Accordingly, the third training level advantageously provides a training system configured for periodic, automatic training, enrichment, and entertainment throughout the day. That is, the third training level includes the same uses as the first training level and the second training level, and in addition, the system can be used to entertain the dog throughout the day in set sessions when the trainer/owner is home and/or when the trainer/owner is not at home. Moreover, the third training level requires more mental activity on the part of the animal, and more attention throughout the day, even when the system is not in an active session. Thus, the third training level is particularly effective in training the dog to focus, use his brain, and keep from distractions, such as, for example, barking in the yard due to boredom, etc. The third training level is also effective in keeping the dog from compulsively stepping on or nosing the target.

Figure 6:
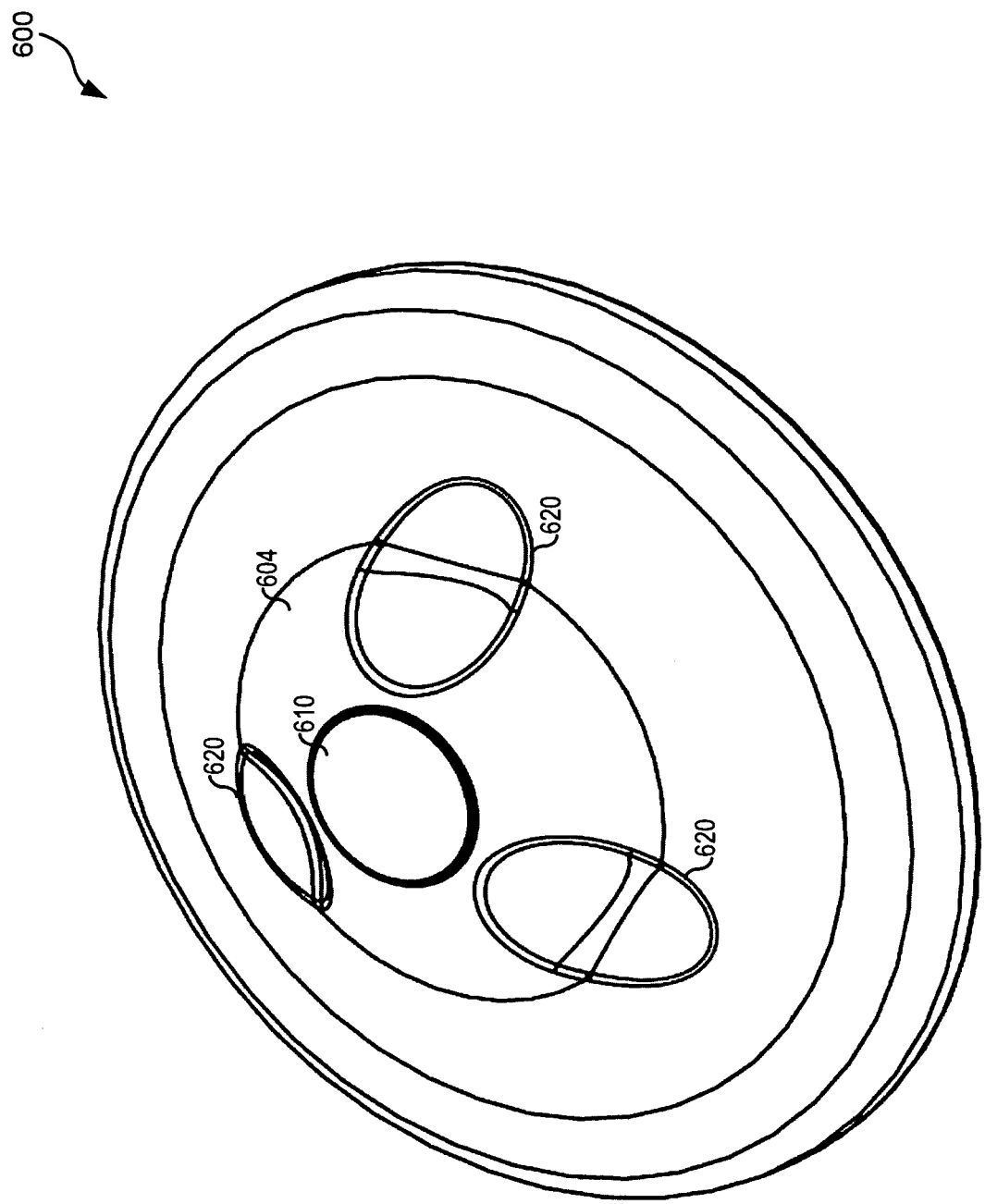
FIG. 6 illustrates a perspective view of a target device in accordance with one embodiment of the present invention.

As described above, in one embodiment, the target includes a housing designed to make it difficult for the animal to pick up and/or move the target. Referring now to FIG. 6, illustrated is an exemplary target in accordance with one embodiment of the present invention. Specifically, FIG. 6 illustrates a perspective view of a target 600.

As illustrated, target 600 includes a housing 602. As shown, housing 602 is roughly saucer-shaped and includes a dome 604. In the illustrated embodiment, dome 604 includes a sensor module 610 and a plurality of reward bays 620. Generally, sensor module 610 is configured as a sensor 140 and a signaling module 134 as described above. Generally, reward bays 620 are configured to receive a food reward and to serve as a grasping point for a human trainer. Additional views of target 600 are shown in FIG. 7.

Figure 7:
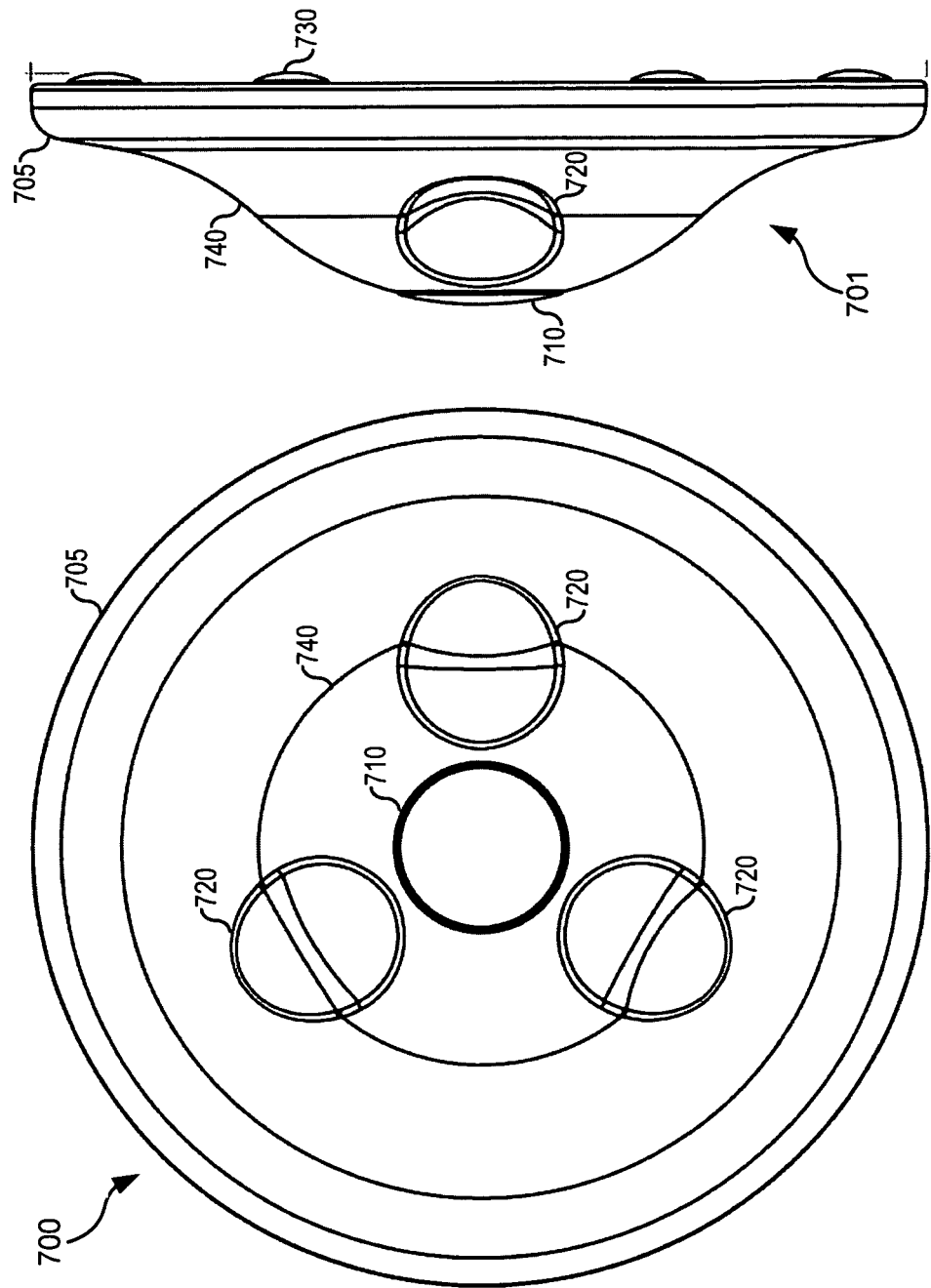
FIG. 7 illustrates a top and side view of a target sensor device in accordance with one embodiment of the present invention.

Referring now to FIG. 7, illustrated is an exemplary target in accordance with one embodiment of the present invention. Specifically, FIG. 7 illustrates a top view of a target 700 and a side view of a target 701. As illustrated, target 700 and target 701 include a housing 705. As shown, housing 705 is roughly saucer-shaped and includes a dome 740. In the illustrated embodiment, dome 740 includes a sensor module 710 and a plurality of reward bays 720. Generally, sensor module 710 is configured as a sensor 140 and a signaling module 134 as described above. Generally, reward bays 720 are configured to receive a food reward unit and to serve as a grasping point for a human trainer. Additionally, target 701 includes pads 730. Generally, pads 730 are configured to provide support and stability to housing 705.

Figure 8:
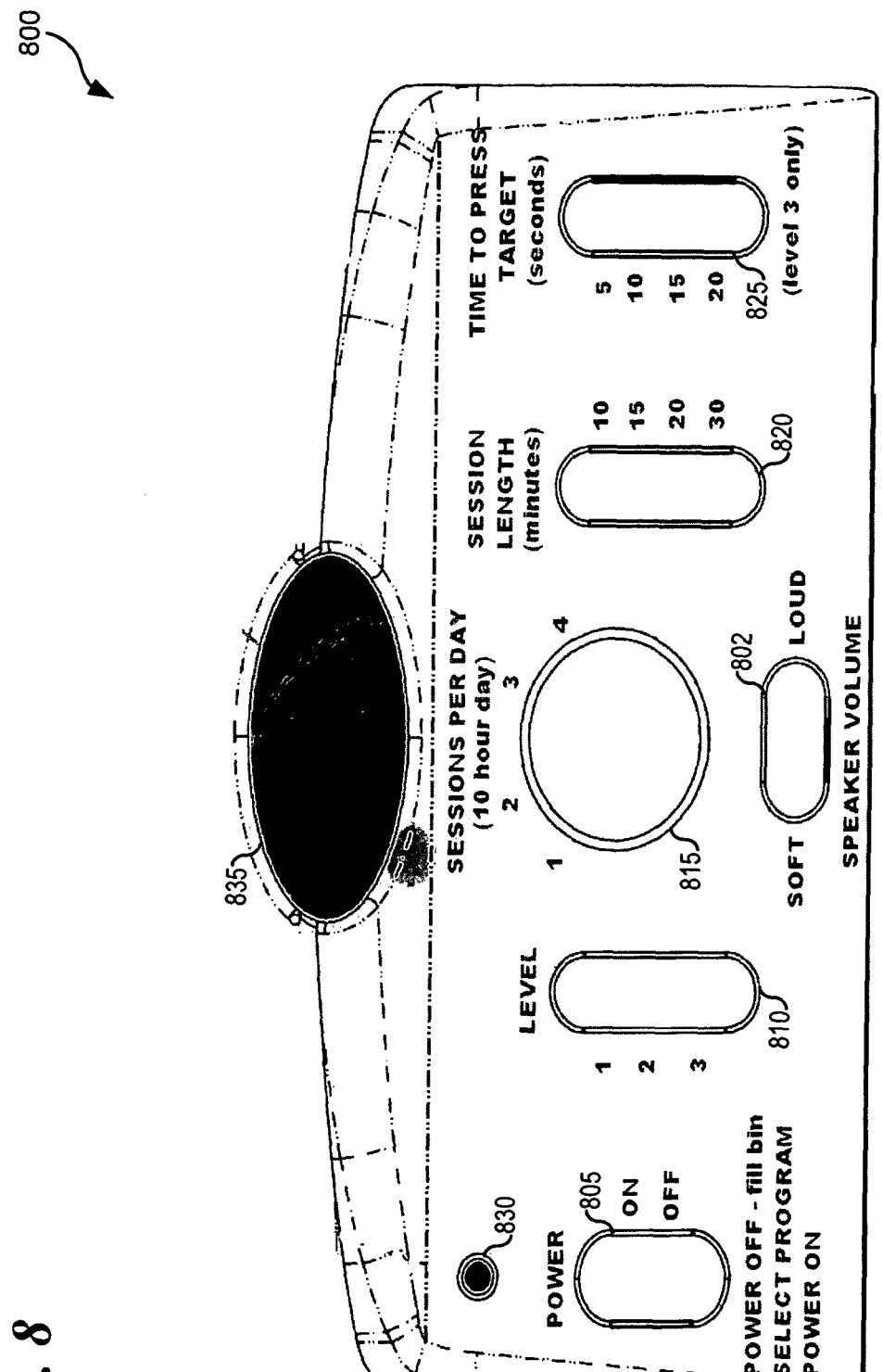
FIG. 8 illustrates an exemplary user interface of a dispenser in accordance with one embodiment of the present invention.

As described above, the target operates in conjunction with a dispenser configured with a user interface. Referring now to FIG. 8, illustrated is an exemplary user interface 800 configured in accordance with one embodiment of the present invention. As illustrated, user interface 800 includes a volume control 802, which is configured to allow the user to set a volume range of signaling module 116.

User interface 800 also includes a power switch 805, a training level switch 810, a sessions per day dial 815, a session length switch 820, a time to press target switch 825, a power indicator LED 830, and a reward signal LED 835. One skilled in the art will appreciate that user interface 800 can also include additional or fewer controls.

In the illustrated embodiment, training level switch 810 comprises three settings. Each of the three settings corresponds to a different training level, as described above. Sessions per day dial 815 comprises four settings, allowing the user to select from one active session per day up to four active sessions per day. Session length switch 820 comprises four settings of ten minutes, fifteen minutes, twenty minutes, and thirty minutes. Time to press target switch 825 comprises four settings ranging in increments of five seconds beginning at five seconds and extending to twenty seconds.

As illustrated, user interface 800 also includes power indicator LED 830, and a reward signal LED 835. Generally, power indicator LED 830 indicates whether the dispenser is turned on, and/or whether there is an error condition, described in more detail below. Generally, reward signal LED 835 indicates (to the animal) that a food reward is being dispensed into the reward bay (not shown). So configured, user interface 800 can serve as a user interface 110 of FIG. 1, for example.

As described above, system 100 of FIG. 1 can be configured to operate as described in more detail in FIGS. 2 through 5, especially if also configured as illustrated in FIGS. 6 through 8. As such, system 100 can be configured to provide a highly customizable training system for an animal.

For example, in one embodiment, a dog owner operating system 100 selects between three training levels though interface 110. In all levels, the dog owner selects the speaker volume of the target (signaling module 134), switches on the power (power supply 136), and places the target at a fixed distance from the dispenser 102. The target processor 130 includes a sleep mode circuit to put the target 104 in a low-power state, extending the target power supply 136. In one embodiment, when the user changes the speaker volume, the signaling module 134 emits a tone at 440 Hz of that loudness.

The user fills storage 120 with food rewards enjoyed by the animal. The user sets the system configuration by setting the switches on the user interface 110, including a training level, session length, and periodicity. The user can also set the desired speaker volume for the reward signal of the dispenser 102. When the user changes the speaker volume, signaling module 116 emits a tone at 440 Hz of that loudness.

Generally, the user presses the power button of user interface 110 to start the program. When the user presses the power button, a power indicator LED turns on, and remains on steady for the duration of the program. At the end of the program, the dispenser 102 turns the power indicator LED off and enters a low-power state.

For an exemplary first level training program, the dispenser 102 ignores the session duration and periodicity (and other) user interface switches, except the speaker volume. When the user presses the power button, the training program starts immediately. The target sets the trigger signal LED on the target to off for the duration of this program.

Any time the dog activates the target sensor, the target wirelessly sends a dispense signal to the dispenser. When the dispenser receives the dispense signal, the dispenser will emit a reward signal tone of 659 Hz for a duration of 0.5 seconds and the dispenser activates the reward signal LED for 3 seconds. The dispenser drops a food reward unit in the reward bay 124, within 0.3 seconds of the reward signal, and within 1 second after the dog activates the target sensor.

In the event the storage 120 is empty or the reward bay 124 is jammed, the dispenser will emit no sound and will not attempt to drop a food reward until the owner presses the power button, which will blink 0.5 seconds on and 0.5 seconds off. In the event the reward bay 124 is jammed, the reward bay 124 motor will make one attempt to reverse itself to release the jammed food reward. If successful in releasing the food reward, the program resumes.

At the completion of the program duration, the system turns the power indicator LED off if the entire program was completed without any error caused by an empty storage 120 bin or a jammed mechanism. When the user presses the power button to start the program, the dispenser drops one food reward unit to test the reward bay 124. If reward bay 124 is jammed, the signaling module 116 emits a tone of 600 Hz for one second and the power indicator LED blinks for 0.5 seconds on and 0.5 seconds off until the user presses the power button again.

For an exemplary second level training program, the dispenser 102 configures the system according to the system configuration settings (e.g., training program, session duration, session periodicity, etc.). The owner sets the session length switch to 10, 15, 20, or 30 minutes. Dispenser 102 ignores the setting on the "time to press target" switch. When the user presses the power button in the dispenser, the program starts after 20 seconds. In one embodiment, system 100 assumes a 10-hour day. In an alternate embodiment, system 100 assumes an 8-hour day. For ease of illustration, the following discussion refers to an assumed 10-hour day. One skilled in the art will understand that the relevant parameters, such as, for example, the session duration and number of hours between sessions, can be adjusted to accommodate an 8-hour assumed day.

With the sessions per day switch set to 1, the only session will start 20 seconds after the user presses the power button. The session lasts as long as the setting selected on the session length switch.

With the sessions per day switch set to 2, the first session will start 20 seconds after the user presses the power button. The second (and last) session will start 6 hours after the first session starts. Both sessions last as long as the setting selected on the session length switch.

With the sessions per day switch set to 3, the first session will start 20 seconds after the user presses the power button. The next session starts 4 hours after the first session starts. The last session starts 8 hours after the user presses the power button. All three sessions last as long as the setting selected on the session length switch.

With the sessions per day switch set to 4, the first session will start 20 seconds after the user presses the power button. The next session starts 3 hours after the first session starts. The following session starts 6 hours after the user presses the power button. The last session starts 9 hours after the user presses the power button. All four sessions last as long as the setting selected on the session length switch.

During each session, the trigger signal LED on the target is steady on. The trigger signal LED is off during the time period between sessions. During each session, signaling module 134 emits a repeating array of tones from the speaker as follows, for example:

| | | | |
|---|---|---|---|
| 262 Hz | C4 | do | .300 sec |
| 294 Hz | D4 | ray | .300 sec |
| 330 Hz | E4 | mi | .300 sec |
| 349 Hz | F4 | fa | .300 sec |
| 392 Hz | G4 | so | .300 sec |
| 440 Hz | A4 | la | .300 sec |
| 494 Hz | B4 | ti | .300 sec |
| 523 Hz | C5 | do | .300 sec |
| 494 Hz | B4 | ti | .300 sec |
| 440 Hz | A4 | la | .300 sec |
| 392 Hz | G4 | so | .300 sec |
| 349 Hz | F4 | fa | .300 sec |
| 330 Hz | E4 | mi | .300 sec |
| 294 Hz | D4 | ray | .300 sec |

Generally, the total length of this array is between around 4.2 to 4.5 seconds. The target repeats this array continuously during the active session, with a variable gap between repetitions. During the active session, the target and dispenser operate as described above.

For an exemplary third level training program, the dispenser 102 configures the system according to the system configuration settings (e.g., training program, session duration, session periodicity, etc.). In particular, the owner selects 5, 10, 15, or 25 seconds on the time to press target switch. Generally, system 100 operates as described above with respect to the exemplary second level training program, with the following additions:

If the dog owner sets the time to press target switch to 5 seconds, the time from the end of one tonal array to the start of the next tonal array will average 5 seconds, with a range between 4 to 7 seconds. Each tonal array plays for 3 seconds. The dog must activate the target sensor while the song is playing for the target to transmit the dispense signal (and in order for the dispenser to drop a food reward). System 100 repeats this sequence for the duration of the session as selected on the session length switch.

If the dog owner sets the time to press target switch to 10 seconds, the time from the end of one tonal array to the start of the next tonal array will average 10 seconds, with a range between 8 to 12 seconds. Each tonal array plays for 5 seconds. The dog must activate the target sensor while the song is playing for the target to transmit the dispense signal (and in order for the dispenser to drop a food reward). System 100 repeats this sequence for the duration of the session as selected on the session length switch.

If the dog owner sets the time to press target switch to 10 seconds, the time from the end of one tonal array to the start of the next tonal array will average 10 seconds, with a range between 8 to 12 seconds. Each tonal array plays for 5 seconds. The dog must activate the target sensor while the song is playing for the target to transmit the dispense signal (and in order for the dispenser to drop a food reward). System 100 repeats this sequence for the duration of the session as selected on the session length switch.

If the dog owner sets the time to press target switch to 15 seconds, the time from the end of one tonal array to the start of the next tonal array will average 15 seconds, with a range between 12 to 17 seconds. Each tonal array plays for 7 seconds. The dog must activate the target sensor while the song is playing for the target to transmit the dispense signal (and in order for the dispenser to drop a food reward). System 100 repeats this sequence for the duration of the session as selected on the session length switch.

If the dog owner sets the time to press target switch to 25 seconds, the time from the end of one tonal array to the start of the next tonal array will average 25 seconds, with a range between 17 to 30 seconds. Each tonal array plays for 7 seconds. The dog must activate the target sensor while the song is playing for the target to transmit the dispense signal (and in order for the dispenser to drop a food reward). System 100 repeats this sequence for the duration of the session as selected on the session length switch. Generally, the settings, including the number of sessions determine the song length, the length of the wait between songs, and other configuration lengths.

For all four options, if the dog presses the target during a session while the tonal array is not playing, the countdown to the next song resets.

Therefore, system 100 can be configured to train a dog in a variety of approaches, without extensive pre-training. That is, generally, the embodiments disclosed herein are configured to require only minimal pre-training of an animal before unsupervised use. In some cases, however, it may be desirable to introduce a particular embodiment to an animal. As such, in accordance with one embodiment of the present invention, the following exemplary pre-training protocols are suitable for use in conjunction with the embodiments disclosed herein.

In training dogs for the first level, for example, the owner configures the system as described above for the first level program, but the owner activates the target sensor herself (holding the target in her hands) to trigger the dispensation. For example, the owner first sets the level to 1, then manually adds food rewards to the dispenser reward bay so that the dog learns that the reward bay contains food rewards. Then with the volume on low, the owner activates the target sensor, repeating until the dog automatically retrieves the food rewards from the reward bay when it hears the reward signal.

Next, so that dog does not learn to bark at, paw, or stare at the dispenser, and to ensure the animal understands that the reward tone or light indicates that a food reward will be dispensed, the owner starts activating the target sensor only when the dog looks at the owner's face. To encourage the dog to look at the owner's face, the owner can give some food rewards from the direction of her face. Then, when the dog looks at her, the owner can activate the target sensor to dispense food rewards.

Next, the owner trains the dog to press the target (activating the target sensor) in order to release food rewards himself. The dog can activate the target sensor with a paw or nose. To train the dog to press with his nose, the owner places the target on the floor or wall at the dog's nose level, very close to the dispenser, with a small dab of peanut butter or wet dog food (just enough for one lick). When the dog licks or grabs the food it activates the target's pressure sensor and food reward is dispensed. The animal retrieves a food reward from the dispenser.

Next, the owner trains the dog to press the target (activating the target sensor) in order to release food rewards himself. The dog can activate the target sensor with a paw or nose. To train the dog to press with his nose, the owner places the target on the floor or wall at the dog's nose level, very close to the dispenser, with a small dab of peanut butter or wet dog food (just enough for one lick). When the dog licks or sniffs the target, or grabs the food, it activates the target's pressure sensor and food reward is dispensed. The animal activates the target sensor, and the dog retrieves a food reward from the dispenser.

Once the animal reliably licks or takes the food from the target (e.g., 10-20 times in a row), and then retrieves the dispensed food reward from the dispenser, the owner can remove the food lure from the target bays. The owner should then encourage the pet to investigate the target. When the animal touches the target, triggering the sensor, a food reward will dispense from the dispenser.

In the event the dog will not touch the target on the floor, the owner can hold it closer to the dog's nose level at first. When the dog can activate the target sensor 10 times in a row without hesitation after getting a treat, the owner can move the target approximately 6 inches from the dispenser. As the dog's performance improves, the owner can move the target farther and farther away, increasing the exercise the dog must perform to retrieve the food reward.

In training dogs for the second level, for example, the owner trains the dog as described above for the first level. Next, the owner sets the system machine to the second training level. The owner can place the target on the wall or floor (or on chair at the dog's nose level). The pet should immediately want to go over to the target in order to earn food rewards. When the trigger signal (the tone and/or light on the target) activates, the owner releases the dog so that the dog can touch the target. The owner may need to encourage the dog to do so. When the dog touches the target a food reward is dispensed. The owner should be sure that the trigger signal is activated during this portion of the training.

To end the session, or when the trigger signal ends, indicating the end of a session, the owner removes the target from the dog's view so that the dog does not keep trying to activate the target sensor. Alternatively, the owner can teach the dog specifically that when light is off targeting does not work by letting the dog try to activate the target sensor when the trigger signal is not activated. Eventually, the dog will cease trying to activate the target sensor, although it will typically take many repetitions for the dog to understand that the dispenser only dispenses food rewards when the trigger signal is activated.

In training dogs for the third level, for example, the owner trains the dog as described above for the first levels. Next, the owner sets the system machine to the third training level. The owner sets the machine to level 3 with food rewards every 5 seconds. The owner restrains the dog, showing the treat/target, which is just out of reach. When the trigger signal (the tone and/or light on the target) activates, the owner immediately encourages the dog to touch the target, releasing the dog so that the dog can reach the target.

Once the dog has successfully activated the target sensor (and retrieved the food reward the dispenser), the owner again restrains the dog until the next trigger signal. Alternatively, the owner can hold the target away from the dog, only situating the target within the dog's reach when the trigger signal activates. Generally, dogs learn fastest if they suddenly see and hear a cue. As such, once the dog perks its ears and surges to the target every time it hears the trigger signal, the owner can let the dog loose to try to activate the target sensor at will.

Once the dog is loose, it may attempt to activate the target sensor when the trigger signal is not activated. If the dog does attempt to activate the target sensor when the trigger signal is not activated, no food rewards will come from the dispenser, and the dog will have to wait longer for the next trigger signal. Eventually, the dog will learn to only attempt to activate the target sensor when the trigger signal is activated.

Thus, generally, system 100 trains, enriches, and entertains an animal confined to a limited space, while offering numerous advantages over other methods and systems. For example, embodiments described herein allow a user to configure system 100 to train and entertain an animal for a predetermined duration of time, without requiring the continuous presence of the user. Additionally, the described embodiments keep food rewards confined to an enclosed space not readily accessible to household pests and airborne molds and fungi.

Disclosed embodiments allow for dispensation of only 1-2 kibbles of food. Typical systems either do not or cannot dispense that precise of an amount. For example, in prior art "bubble gum machine" configurations, the owner/trainer cannot determine in advance how much food will come out when dog steps on the activation handle. Moreover, in such systems, the food reward is a lot of food (5-10 kibbles), and the food takes a while to come out. In the disclosed embodiments herein, the food reward is 1-2 kibbles in size.

Furthermore, the embodiments disclosed herein train and entertain an animal without requiring the animal to initiate the activity, nor requiring the animal to show interest in the device by moving nearby. In both cases, the embodiments disclosed herein train and entertain the animal by providing an interesting stimulus that the animal understands predicts his opportunity to earn a food reward if he performs a certain task within a given time period. The stimulus occurs to the animal at a varying time, and can start while the animal sleeps or resides in a different location of the confined space. The disclosed embodiments achieve animal entertainment without including small attachments thrown from the device and easily lost, or including moving parts that an animal can overpower.

The disclosed embodiments also provide numerous training advantages over prior methods and systems that attempt to address the need to provide for entertainment, enrichment, and exercise for confined animals. One such method spreads food about the space in which the animal is confined. With this type of product animals can get food at their leisure once it is scattered. But the animal just finds food and does not have to perform a behavior to get the food. Since there is no urgency or contingency to obtaining the food, this method relies only on animal being hungry.

In the disclosed embodiments, however, the animal's learned targeting behavior becomes stronger and stronger over time because the animal is rewarded, increasing the likelihood that the animal will want to perform the behavior when it has the opportunity. Additionally, in prior art systems, the food may be available all day until the pet has eaten all the food or gets bored. However, in the disclosed embodiments, a game can be initiated and cued by the target, such that the animal knows it only has a limited time to perform the behavior, thus making the game a more valuable resource.

Many other devices currently used to entertain an animal are stationary objects that require the animal to initiate movement or interaction with the device, such as a ball or toy mouse. Animals often become bored because the device does not provide a new or exciting activity in which the animal participates. However, in the disclosed embodiments, the limited sessions restrict the time the animal has to earn a set number of rewards, often on cue, making the game more compelling to the animal.

Other devices attempt to stimulate the animal by initiating an activity in which the animal participates in a prescribed manner, typically by providing a food incentive to encourage the animal to participate with the device. In some cases, the animal must first wander near the device to initiate interaction. However, the disclosed embodiments reward an animal for performing a task repeatedly, instead of merely being in a particular location. Additionally, the disclosed embodiments provide exercise that is more physically and mentally stimulating than devices that merely require an animal to wander near the dispenser.

Other modern devices utilize small attachments that launch at periodic intervals from the device, for the animal to chase and catch. Unfortunately, these devices are prone to jamming or the loss of the attachments. Further, even if the attachments are not lost, the devices often require the owner to be present in order to activate the device. Further, these devices do not require the animal to perform a task to launch an attachment. The disclosed embodiments, however, provide mental stimulation by requiring the animal to perform a task to earn the food reward, and do not employ small, easily losable attachments.

Other modern devices move an object repeatedly in order to tempt the animal into attacking the object, which is a kind of exercise. But because the animal is not required to perform a task to earn the food reward, the behavior is not strengthened each time. In the disclosed embodiments, however, the animal is required to perform a task, which strengthens the desired behavior.

As such, the disclosed embodiments provide a method and system for training an animal that provides more than just physical stimulation. At the same time, the disclosed embodiments also reward the animal from more than just standing stationary. The disclosed embodiments require the animal to perform repeatedly a task that provides exercise and requires training.

Additionally, the disclosed embodiments also limit the access to the training activity to less than 100% unfettered access. One skilled in the art will understand that an animal training activity will eventually lose its impact if the animal has 100% access to earning the food reward or playing the game. As such, the disclosed embodiments restrict the animal's access to the rewards, which helps maintain the animal's motivation to perform the task/exercise. One skilled in the art will understand that motivation generally increases with restricted access to the motivator (reward).

One skilled in the art will appreciate the embodiments disclosed above, and other features and functions, or alternatives thereof, may be desirably combined into many other different systems or applications. Additionally, various presently unforeseen or unanticipated alternatives, modifications, variations or improvements therein may be subsequently made by those skilled in the art, which are also intended to be encompassed by the following claims.

What is claimed is:

1. A method for training an animal, comprising:
providing a dispenser in a first location accessible to a predetermined animal;
wherein the dispenser comprises a storage compartment configured to store rewards and to dispense rewards, a first signaling module configured to generate a reward signal for the animal to know a reward is being dispensed, and a wireless module configured to receive a dispense signal;
providing a target in a second location, wherein the second location is a distance from the first location and is based on a training condition for the animal; and
setting a system configuration of the dispenser and the target;
wherein the target comprises a second signaling module, a sensor, and a wireless module configured to transmit a wireless dispense signal;
wherein the target at the second location determines that the animal has performed a desired action and, based on the determination, wirelessly transmits the dispense signal;
wherein the dispenser generates the reward signal to inform the animal that a reward is being dispensed in response to receiving the dispense signal; and
wherein the system configuration comprises at least one training program having a session length, and a periodicity and performs training based on the training program.

2. The method of claim 1, wherein the reward signal is a flashing light.

3. The method of claim 1, wherein the reward signal is an audible tone.

4. The method of claim 1, wherein the reward signal is an audible tone and a visible light.

5. The method of claim 1, wherein the dispenser is further configured to generate the reward signal within 0.3 seconds of the dispense signal.

6. The method of claim 1, wherein the dispenser is further configured to dispense a food reward to the reward bay within one second of the animal performing the desired action.

7. The method of claim 1, further comprising:
wherein the dispenser is further configured to transmit an attention signal to the target; and wherein the target is further configured to receive the attention signal and to generate a trigger signal in response to a received attention signal.

8. The method of claim 1, further comprising increasing the fixed distance between the first location and the second location in response to the animal successfully performing the desired action.

9. The method of claim 1, further comprising:
wherein the second signaling module of the target is further configured to generate a series of tones audible to the animal for a predetermined play period based on the training program; and
wherein the desired action comprises touching the target sensor during the play period.

* * * * *